(12) United States Patent
Crump et al.

(10) Patent No.: US 6,226,676 B1
(45) Date of Patent: May 1, 2001

(54) CONNECTION ESTABLISHMENT AND TERMINATION IN A MIXED PROTOCOL NETWORK

(75) Inventors: Richard Crump, Boston; Mark F. Leary, Franklin; Ellis L. Wong, Billerica, all of MA (US); Donald F. Betsinger, Fairport, NY (US); Shuching Shieh, Nashua, NH (US)

(73) Assignee: Nortel Networks Corporation, Montreal (CA)

( * ) Notice: Subject to any disclaimer, the term of this patent is extended or adjusted under 35 U.S.C. 154(b) by 0 days.

(21) Appl. No.: 09/167,916

(22) Filed: Oct. 7, 1998

(51) Int. Cl.$^7$ ...................................................... G06F 13/00
(52) U.S. Cl. ......................... 709/227; 709/230; 709/237; 709/250
(58) Field of Search ..................................... 709/227, 228, 709/230, 232, 236, 237, 238, 245, 246, 249, 250

(56) References Cited

U.S. PATENT DOCUMENTS

| | | | |
|---|---|---|---|
| 5,021,949 | * 6/1991 | Moren et al. | 364/200 |
| 5,182,748 | * 1/1993 | Sakate et al. | 370/94.1 |
| 5,719,901 | * 2/1998 | Riche et al. | 375/222 |
| 5,793,771 | * 8/1998 | Darland et al. | 370/467 |
| 5,918,022 | * 6/1999 | Batz et al. | 709/236 |

* cited by examiner

Primary Examiner—Viet D. Vu
(74) Attorney, Agent, or Firm—Bromberg & Sunstein LLP

(57) ABSTRACT

A method, translating apparatus, apparatus comprising a computer readable medium, and system for establishing and terminating an end-to-end connection in a mixed protocol communication network includes a translation function that communicates with a first device using a first communication protocol and a second device using a second communication protocol. In order to establish an end-to-end connection, the translation function receives a first data message from the first device, establishes a connection with the second device, and transmits a second data message to the second device. In order to terminate an end-to-end connection, the translation function receives a reset message from the first device, terminates the connection with the second device, and transmits a reset confirmation message to the first device.

36 Claims, 6 Drawing Sheets

US 6,226,676 B1

CONNECTION ESTABLISHMENT AND TERMINATION IN A MIXED PROTOCOL NETWORK

CROSS-REFERENCES TO RELATED APPLICATIONS

This patent application may be related to the following commonly-owned United States patent applications:

U.S. patent application Ser. No. 09/167,950 entitled ERROR RECOVERY IN A MIXED PROTOCOL NETWORK, filed on even date herewith, and hereby incorporated by reference in its entirety;

U.S. patent application Ser. No. 09/167,839 entitled ESTABLISHING AND TERMINATING CONNECTIONS IN A MIXED PROTOCOL NETWORK, filed on even date herewith, and hereby incorporated by reference in its entirety;

U.S. patent application Ser. No. 09/167,792 entitled SYSTEM FOR TRANSLATING A MESSAGE FROM A FIRST TRANSMISSION PROTOCOL TO A SECOND TRANSMISSION PROTOCOL, filed on even date herewith, and hereby incorporated by reference in its entirety;

U.S. patent application Ser. No. 09/167,746 entitled EFFICIENT RECOVERY OF MULTIPLE CONNECTIONS IN A COMMUNICATION NETWORK, filed on even date herewith, and hereby incorporated by reference in its entirety; and U.S. patent application Ser. No. 09/167,811 entitled MANAGEMENT SYSTEM, filed on even date herewith, and hereby incorporated by reference in its entirety.

FIELD OF THE INVENTION

The present invention relates generally to data communication networks, and, more particularly, to connection control in a mixed protocol network.

BACKGROUND OF THE INVENTION

In today's information age, data communication networks are becoming ever more pervasive as an ever-increasing number of communication consumers require access to on-line computer resources. To that end, many data communication networks are evolving to meet the needs of these communication consumers. As these data communication networks evolve, it often becomes necessary to combine or integrate network segments that support different communication protocols.

The most common problem that arises when integrating or combining network segments that utilize different protocols is that the devices on one network segment using a first communication protocol do not communicate with the devices on another network segment using a second communication protocol. One solution is to convert or replace devices so that all devices utilize a common communication protocol. Unfortunately, this is often expensive, time-consuming, and disruptive to the network users. Furthermore, such conversion or replacement often requires that end-user applications be changed, which can further complicate the integration process and force end-users to learn new applications. Thus, a need has remained for a translation function that allows the devices utilizing the first communication protocol to communicate with the devices using the second communication protocol.

SUMMARY OF THE INVENTION

In accordance with one aspect of the invention, a method, translating apparatus, apparatus comprising a computer readable medium, and system for establishing an end-to-end connection in a mixed protocol communication network includes a translation function that communicates with a first device using a first communication protocol and a second device using a second communication protocol. In order to establish an end-to-end connection, the translation function receives a first data message from the first device, establishes a connection with the second device, and transmits a second data message to the second device containing data from the first data message.

In a preferred embodiment of the invention, the first communication protocol is an x.25 protocol. In such a preferred embodiment, receiving the first data message from the first device involves receiving an X.25 data packet from the first device.

In a preferred embodiment of the invention, the second communication protocol is a Transmission Control Protocol (TCP). In such a preferred embodiment, establishing a connection with the second device involves transmitting to the second device a first TCP SYN message, receiving from the second device a second TCP SYN message, and transmitting to the second device a TCP SYN/ACK message.

In accordance with another aspect of the invention, a method, translating apparatus, apparatus comprising a computer readable medium, and system for terminating an end-to-end connection in a mixed protocol communication network includes a translation function that communicates with a first device using a first communication protocol and a second device using a second communication protocol. In order to terminate an end-to-end connection, the translation function receives from the first device a reset message suspending data flow between the first device and the translating function, terminates the connection with the second device, and transmits a reset confirmation message to the first device.

In a preferred embodiment of the invention, the first communication protocol is an X.25 protocol. In such a preferred embodiment, receiving a reset message from the first device involves receiving an X.25 reset message from the first device. Also in such a preferred embodiment, transmitting a reset confirmation message to the first device involves transmitting an X.25 confirm message to the first device.

In a preferred embodiment of the invention, the second communication protocol is a Transmission Control Protocol (TCP). In such a preferred embodiment, terminating the connection with the second device involves transmitting to the second device a first TCP FIN message, receiving from the second device a second TCP FIN message, and transmitting to the second device a TCP FIN/ACK message.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

As discussed above, a need has remained for a translation function that allows the devices using the first communication protocol to communicate with the devices using the second communication protocol. The present invention provides such a translation function by communicating with a first number of devices using the first communication protocol, communicating with a second number of devices using the second communication protocol, and performing appropriate protocol operations to allow end-to-end connections between devices using the first and second communication protocols to be established and terminated.

Figure 1A:
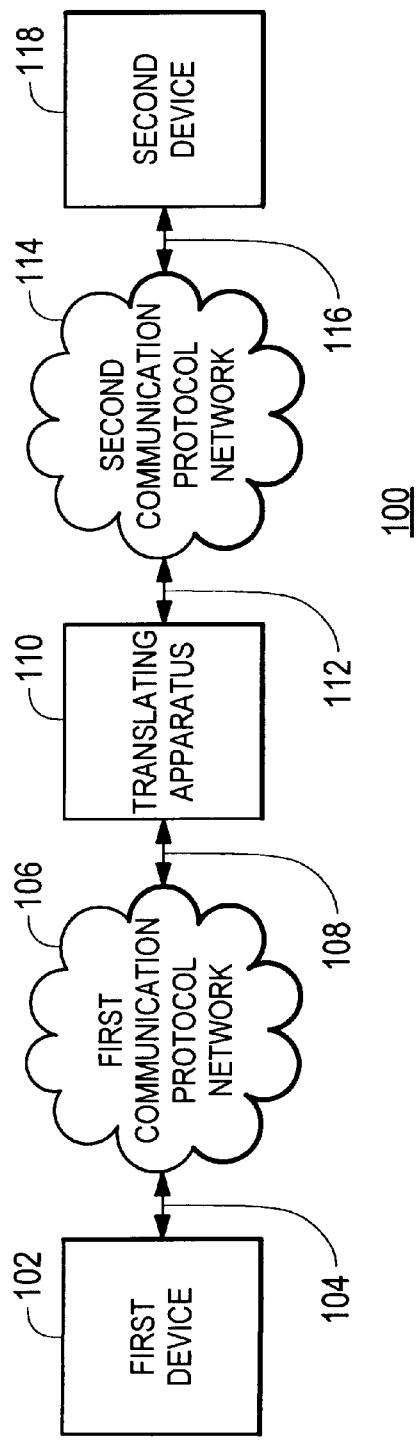
FIG. 1A is a block diagram of an exemplary data communication network in which a translating apparatus is used to allow a first device, which communicates with the translating apparatus over a first communication protocol network, to communicate with a second device, which communicates with the translating apparatus over a second communication protocol network.

FIG. 1A is a block diagram of an exemplary data communication network 100 in which a first device 102 that utilizes a first communication protocol communicates with a second device 118 that utilizes a second communication protocol through a translating apparatus 110. More specifically, the first device 102 is coupled to a first communication protocol network 106 by way of a first link 104. The translating apparatus 110 is also coupled to the first communication protocol network 106 by way of a second link 108. The first device 102 communicates with the translating apparatus 110 over the first communication protocol network 106 using the first communication protocol, and, in particular, over a connection that is established between the first device 102 and the translating apparatus 110.

Continuing to refer to FIG. 1, the second device 118 is coupled to a second communication protocol network 114 by way of a third link 116. The translating apparatus 110 is also coupled to the second communication protocol network 114 by way of a fourth link 112. The second device 118 communicates with the translating apparatus 110 over the second communication protocol network 114 using the second communication protocol, and in particular over a connection that is established between the second device 118 and the translating apparatus 110.

Figure 2A:
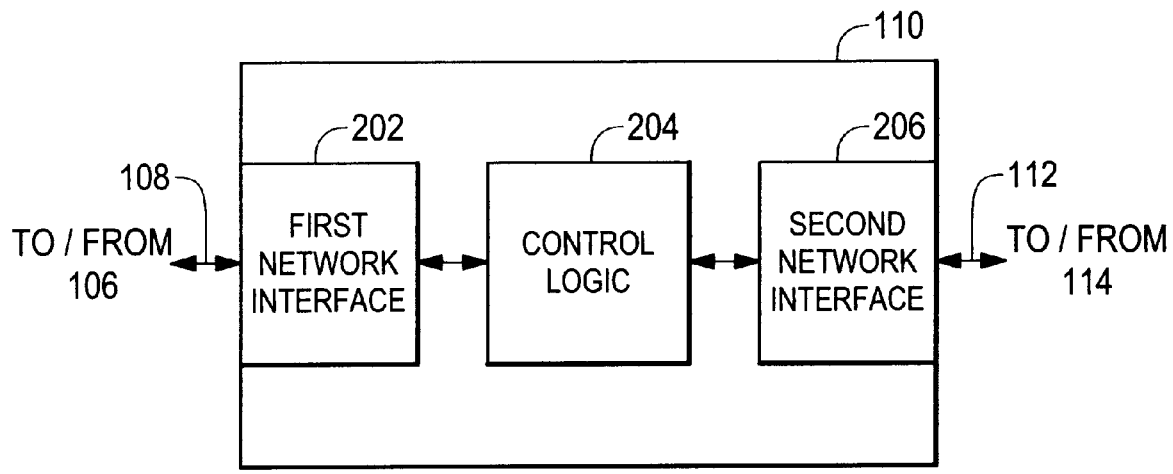
FIG. 2A is a block diagram of an exemplary translating apparatus including a first network interface for communicating with a first device over a first communication protocol network and a second network interface for communicating with a second device over a second communication protocol network.
Figure 2B:
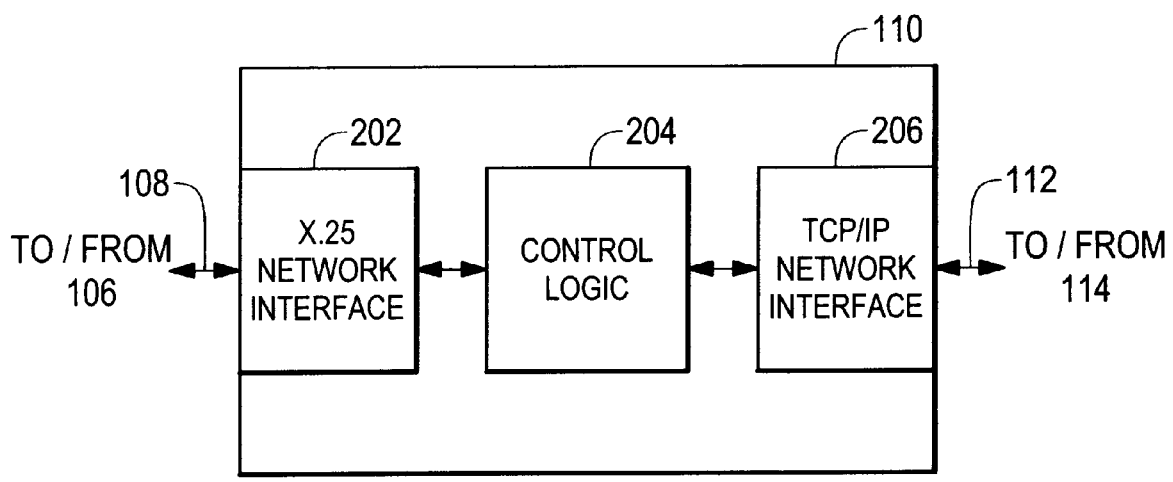
FIG. 2B is block diagram of a preferred embodiment of the exemplary translating apparatus including an X.25 network interface for communicating with an X.25 device over an X.25 network and a TCP/IP network interface for communicating with a TCP device over a TCP/IP network.

FIG. 2A is a block diagram of an exemplary translating apparatus 110 in accordance with a preferred embodiment of the present invention. The translating apparatus 110 includes a first network interface 202 that is couplable to the second link 108. The first network interface 202 includes logic enabling the translating apparatus 110 to communicate with the first device 102 over the first communication protocol network 106. More specifically, the first network interface 202 includes logic for receiving first communication protocol messages from the second link 108, and further includes logic for transmitting first communication protocol messages generated within the translating apparatus 110 onto the second link 108.

Continuing to refer to FIG. 2A, the translating apparatus 110 also includes a second network interface 206 that is couplable to the fourth link 112. The second network interface 206 includes logic enabling the translating apparatus 110 to communicate with the second device 118 over the second communication protocol network 114. More specifically, the second network interface 206 includes logic for receiving second communication protocol messages from the fourth link 112, and further includes logic for transmitting second communication protocol messages generated within the translating apparatus 110 onto the fourth link 112.

Still referring to FIG. 2A, the translating apparatus 110 further includes control logic 204. The control logic 204 performs a translation function to allow the first device 102 to communicate with the second device 118. The control logic 204 is operably coupled to the first network interface 202, through which the control logic 204 receives and transmits first communication protocol messages. The control logic 204 is also operably coupled to the second network interface 206, through which the control logic 204 receives and transmits second communication protocol messages.

In accordance with a preferred embodiment of the present invention, the first communication protocol is a protocol known as the X.25 protocol. The X.25 protocol defines the physical, link, and network layer protocols (layers one, two, and three) of the International Standards Organization (ISO) seven-layer protocol model. In a communication network that utilizes the X.25 protocol (referred to herein as an "X.25 network"), two devices (referred to herein as an "X.25 device" or "X.25 devices") exchange X.25 network layer messages (referred to in X.25 as "packets") over a virtual circuit that is established across the X.25 network. One type of virtual circuit commonly used in the X.25 network is a permanent virtual circuit or PVC. A PVC is a virtual circuit that is set up automatically within the X.25 network and remains active as long as the X.25 network is operative (as opposed to a switched virtual circuit or SVC, which is set up only when explicitly requested by an X.25 device). Typical X.25 networks support multiple virtual circuits, both permanent and switched.

In accordance with a preferred embodiment of the present invention, the second communication protocol is a protocol known as the Transmission Control Protocol (referred to hereinafter as "TCP"). TCP is a connection-oriented transport layer protocol that is generally used in conjunction with a connectionless network layer protocol known as the Internet Protocol or IP. In a communication network that utilizes the TCP protocol (referred to herein as a "TCP/IP network"), two devices (referred to herein as a "TCP device" or "TCP devices") exchange TCP messages (referred to in TCP as "segments") over a TCP connection that is established across the TCP/IP network. In order to set up the TCP connection within the TCP/IP network, two TCP devices exchange specially formatted messages that include, among other things, an IP address identifying the destination TCP device and a TCP port number identifying one of a number of applications supported by the destination TCP device. The combination of IP address and TCP port number is referred to hereinafter as a "socket." Because the TCP connection is set up only when explicitly requested by a TCP device, the TCP connection is considered to be a switched connection as opposed to a permanent connection.

Figure 1B:
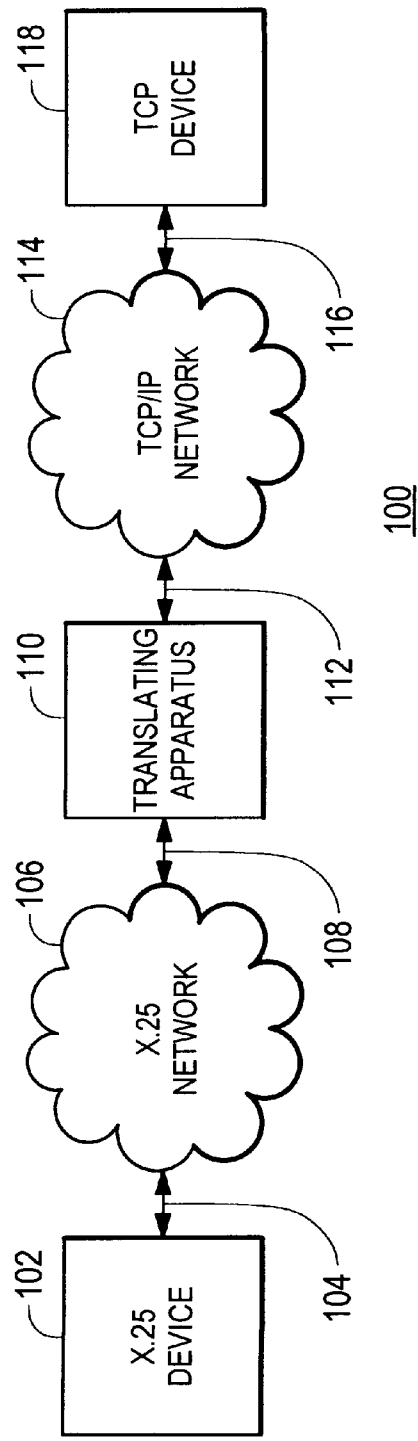
FIG. 1B is a block diagram of a preferred embodiment of the exemplary data communication network in which the translating apparatus is used to allow an X.25 device, which communicates with the translating apparatus over an X.25 network, to communicate with a TCP device, which communicates with the translating apparatus over a TCP/IP network.

FIG. 1B shows a preferred embodiment of the data communication network 100 in which the first communication protocol is the X.25 protocol and the second communication protocol is the TCP protocol. Thus, in accordance with a preferred embodiment of the present invention as shown in FIG. 1B, the X.25 device 102 communicates with the translating apparatus 110 across an X.25 network 106 using the X.25 protocol, and the TCP device 118 communicates with the translating apparatus 110 across a TCP/IP network 114 using the TCP protocol. The preferred translating apparatus 110, as shown in FIG. 1B, therefore includes an X.25 network interface 202 that includes an X.25 protocol stack for interfacing with the X.25 network 106 and a TCP/IP network interface 206 that includes a TCP/IP protocol stack for interfacing with the TCP/IP network 114.

In order for the X.25 device 102 to communicate with the TCP device 118 within the data communication network 100, it is necessary for an end-to-end connection to be established between the X.25 device 102 and the TCP device 118. In order for an end-to-end connection to exist between the X.25 device 102 and the TCP device 118, there must be both an active X.25 connection between the X.25 device 102 and the translating apparatus 110 and an active TCP connection between the translating apparatus 110 and a particular socket in the TCP device 118 (referred to hereinafter as the "destination socket"). In accordance with a preferred embodiment of the present invention, the X.25 device 102 communicates with the translating apparatus 110 over a dedicated X.25 PVC, and therefore an active X.25 connection exists between the X.25 device 102 and the translating apparatus 110 as long as the X. 25 network 106 is operative. On the other hand, because the TCP device 118 communicates with the translating apparatus 110 over a switched TCP connection, the TCP connection between the translating apparatus 110 and the destination socket is established dynamically.

Furthermore, in order for the translating device 110 to provide an end-to-end connection between the X.25 device 102 and the TCP device 118, the translating apparatus 110, and particularly the control logic 204, maintains a map associating the X.25 PVC with the destination socket. In accordance with a preferred embodiment of the present invention, one X.25 PVC maps to one destination socket, and multiple X.25 PVCs can map to the same destination socket.

Application data received from the X.25 device 102 over the X.25 PVC is transmitted by the translating apparatus 110, and particularly by the control logic 204, to the TCP device 118 over the corresponding TCP connection. Likewise, application data received from the TCP device 118 over the TCP connection is transmitted by the translating apparatus 110, and particularly by the control logic 204, to the X.25 device 102 over the corresponding X.25 PVC. Exemplary embodiments of control logic 204 for transferring application data between the X.25 device 102 and the TCP device 118 are described in the related U.S. patent applications Ser. No. 09/167,792 and 09/167,811.

When communication between the X.25 device 102 and the TCP device 118 is completed, it is often desirable for the end-to-end connection between the X.25 device 102 and the TCP device 118 to be terminated. Because the X.25 device 102 communicates with the translating apparatus 110 over a dedicated X.25 PVC, the X.25 connection between the X.25 device 102 and the translating apparatus 110 cannot be terminated. On the other hand, because the TCP device 118 communicates with the translating apparatus 110 over a switched TCP connection, the TCP connection between the translating apparatus 110 and a particular socket in the TCP device 118 is terminated dynamically.

In the data communication network 100, connection establishment and termination may be initiated by either the X.25 device 102 or the TCP device 118. The present patent application describes an exemplary embodiment in which the X.25 device 102 initiates connection establishment and termination. An alternate embodiment in which the TCP device 118 initiates connection establishment and termination is described in the related U.S. patent application Ser. No. 09/167,839.

In accordance with a preferred embodiment of the present invention, the X.25 device 102 initiates establishment of an end-to-end connection by transmitting an X.25 data message (i.e., an X.25 packet containing ) to the translating apparatus 110. Upon receiving the X.25 data message from the X.25 device 102, the translating apparatus 110 establishes a TCP connection with the TCP device 118 using standard TCP message transfers. Then, upon establishing the TCP connection, the translating apparatus 110 sends to the TCP device 118 a TCP data message containing the contained in the X.25 data message.

Figure 3:
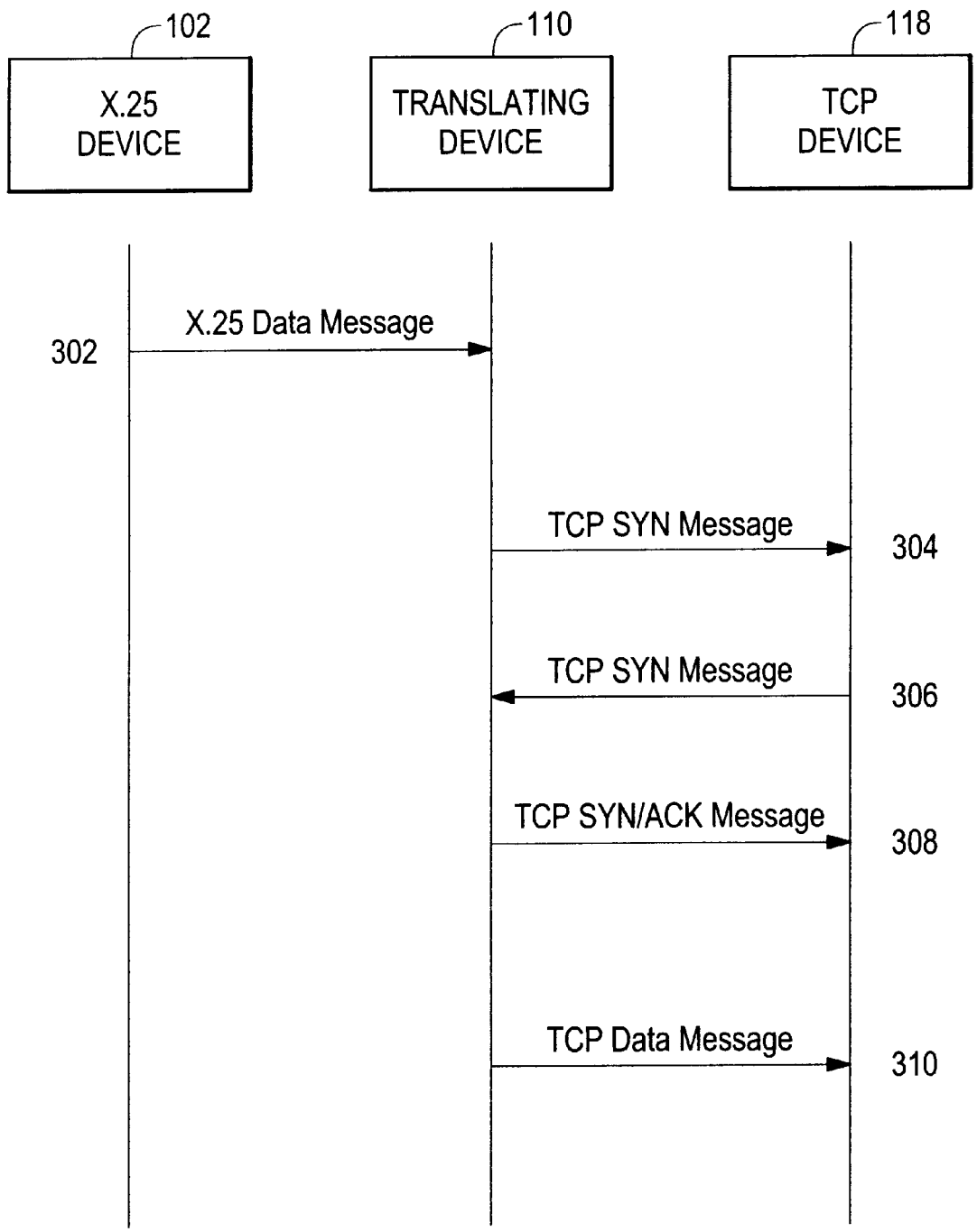
FIG. 3 is a message flow diagram for initiating an end-to-end connection from the X.25 device to the TCP device in accordance with a preferred embodiment of the present invention.

A message flow diagram for initiating an end-to-end connection from the X.25 device 102 to the TCP device 118 is shown in FIG. 3. The X.25 device 102 initiates an end-to-end connection by transmitting an X.25 data message 302 to the translating apparatus 110. Upon receiving the X.25 data message 302, the translating apparatus 110 establishes a TCP connection with the TCP device 118 (often referred to as a "TCP Open") by transmitting a TCP SYN message 304 to the TCP device 118, waiting for a TCP SYN message 306 in response from the TCP device 118, and transmitting a TCP SYN/ACK message 308 to the TCP device 118. Once the TCP connection is established, the translating apparatus 110 transmits to the TCP device 118 a TCP data message 310 containing the application data contained in the X.25 data message 302.

Figure 4:
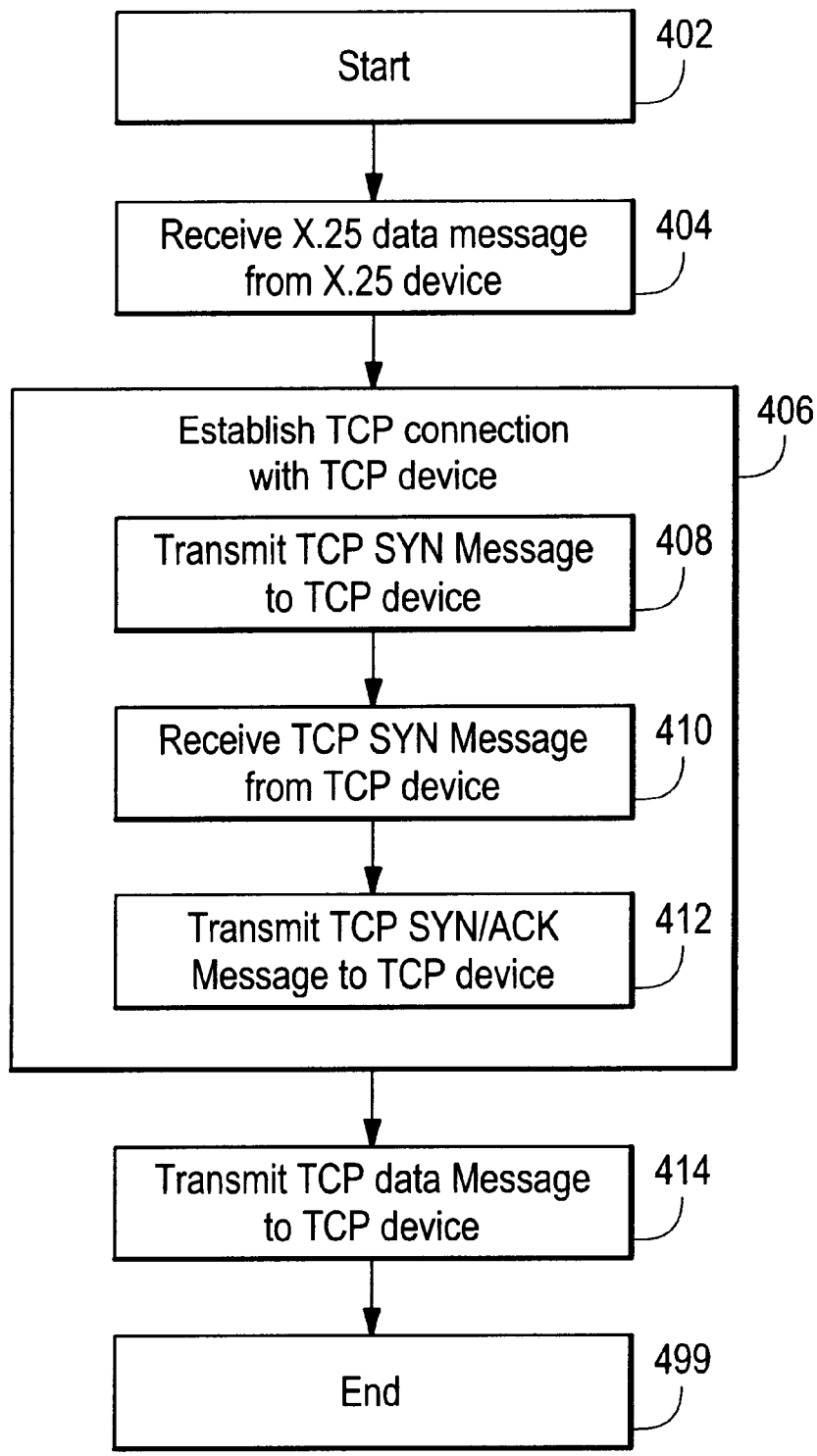
FIG. 4 is a logic flow diagram of exemplary control logic for initiating an end-to-end connection from the X.25 device to the TCP device in accordance with a preferred embodiment of the present invention.

Thus, the translating apparatus 110, and particularly the control logic 204, includes logic for establishing an end-to-end connection from the X.25 device 102 to the TCP device 118. More specifically, the control logic 204 includes logic for performing a set of steps as shown in FIG. 4. Beginning at step 402, the control logic 204 first receives the X.25 data message 302, in step 404. Then, the control logic 204 proceeds to establish a TCP connection with the TCP device 118, in step 406. As described above, establishing the TCP connection in step 406 involves transmitting a TCP SYN message 304 to the TCP device 118 (step 408), waiting for a TCP SYN message 306 in response from the TCP device 118 (step 410), and transmitting a TCP SYN/ACK message 308 to the TCP device 118 (step 412). Once the TCP connection is established in step 406, the control logic 204 transmits to the TCP device 118 a TCP data message 310 containing the application data contained in the X.25 data message 302, in step 414, and terminates in step 499.

In order for an end-to-end connection between the X.25 device 102 and the TCP device 118 to be terminated, the TCP connection between the TCP device 118 and the translating apparatus 110 must be terminated. In accordance with a preferred embodiment of the present invention, the X.25 device 102 initiates termination of an end-to-end connection by transmitting an X.25 reset message to the translating apparatus 110. Upon receiving the X.25 reset message from the X.25 device 102, the translating apparatus 110 terminates the TCP connection with the TCP device 118 using standard TCP message transfers. Then, upon terminating the TCP connection, the translating apparatus 110 sends an X.25 confirm message to the X.25 device 102.

Figure 5:
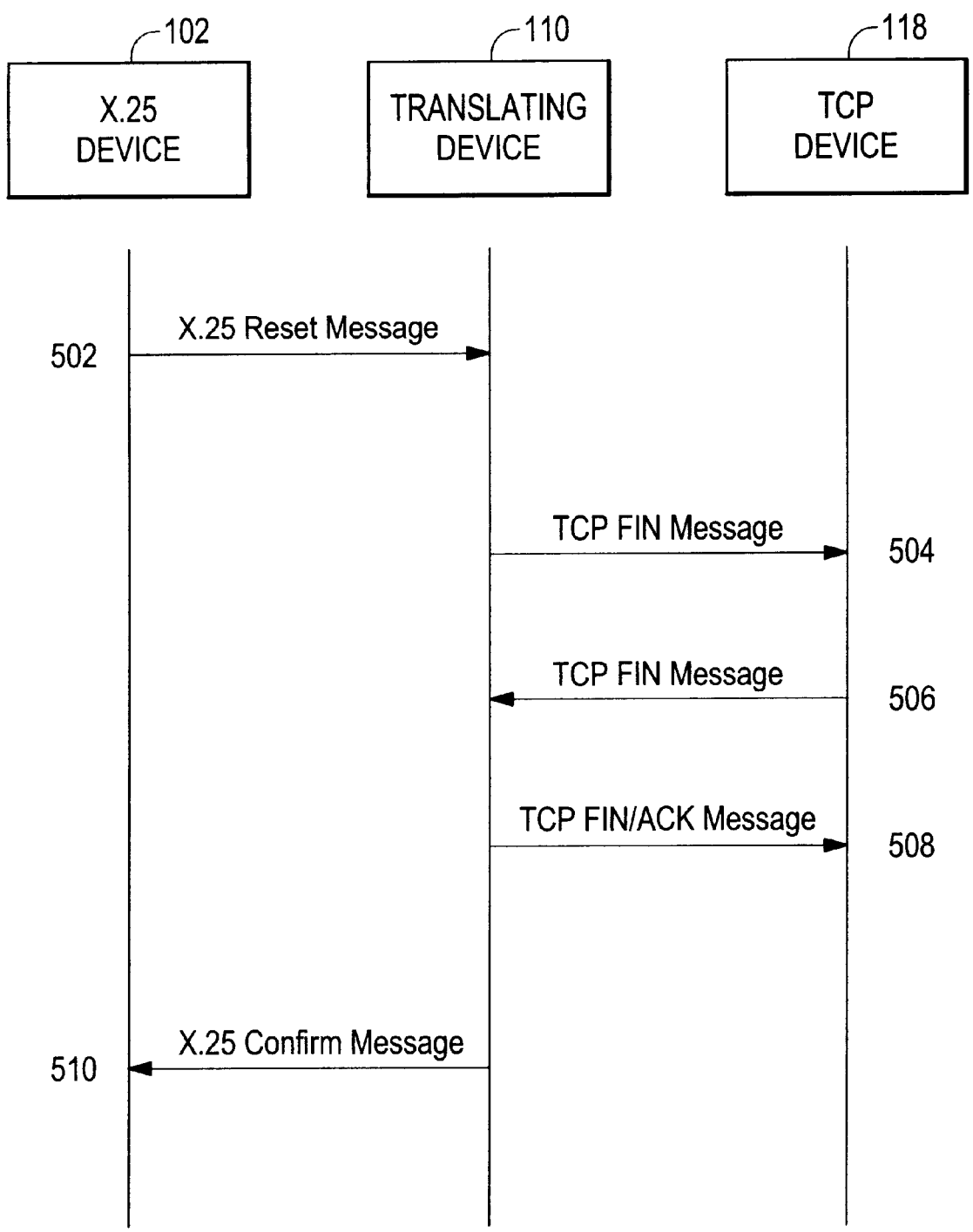
FIG. 5 is a message flow diagram for terminating an end-to-end connection from the X.25 device to the TCP device in accordance with a preferred embodiment of the present invention.

A message flow diagram for terminating an end-to-end connection from the X.25 device 102 to the TCP device 118 is shown in FIG. 5. The X.25 device 102 initiates termination of an end-to-end connection by transmitting an X.25 reset message 502 to the translating apparatus 110. Upon receiving the X.25 reset message 502, the translating apparatus 110 terminates its TCP connection with the TCP device 118 (often referred to as a "TCP Close") by transmitting a TCP FIN message 504 to the TCP device 118, waiting for a TCP FIN message 506 in response from the TCP device 118, and transmitting a TCP FIN/ACK message 508 to the TCP device 118. Once the TCP connection is terminated, the translating apparatus 110 transmits an X.25 confirm message 510 to the X.25 device 102.

Figure 6:
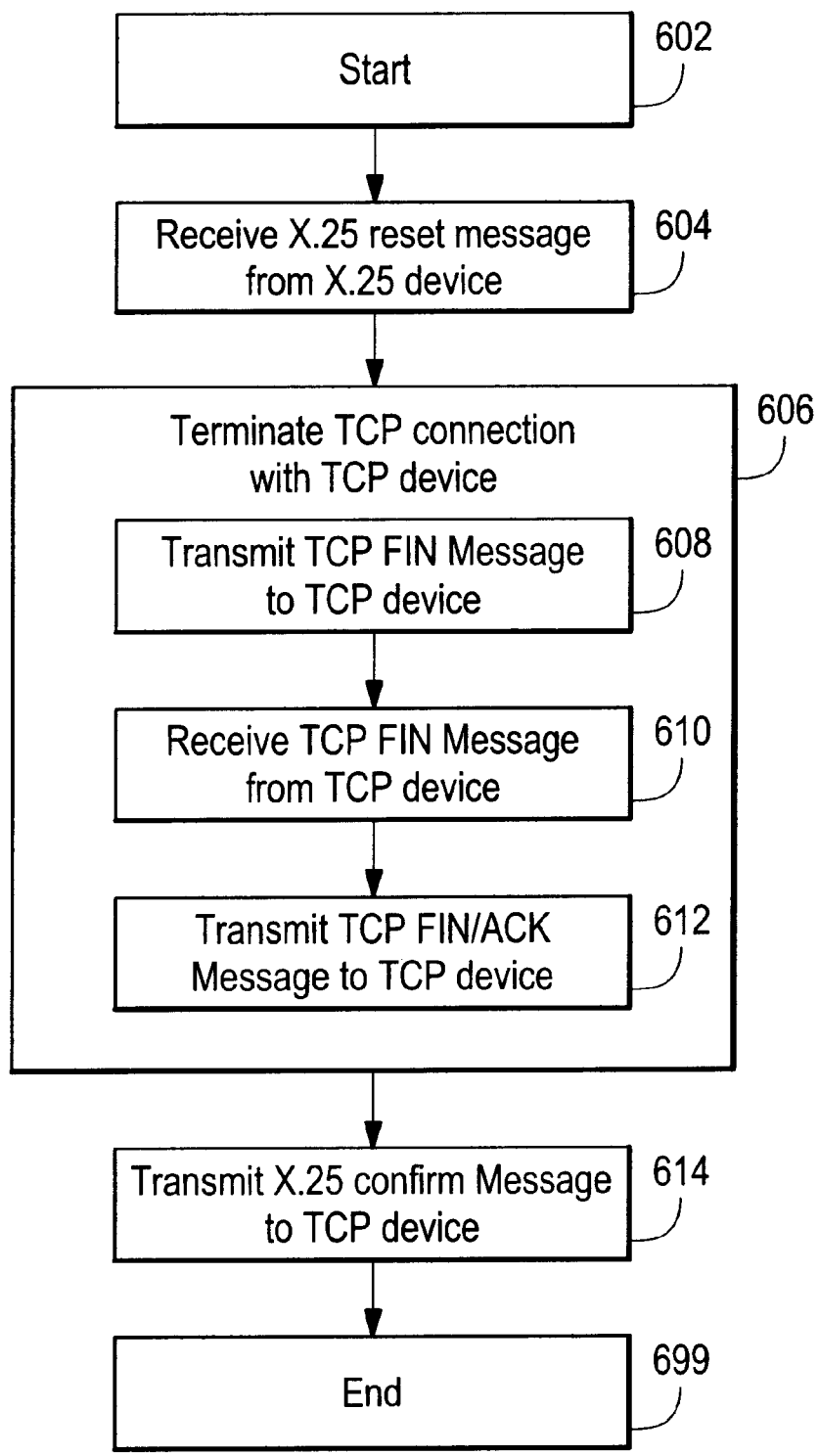
FIG. 6 is a logic flow diagram of exemplary control logic for terminating an end-to-end connection from the X.25 device to the TCP device in accordance with a preferred embodiment of the present invention.

Thus, the translating apparatus 110, and particularly the control logic 204, includes logic for terminating an end-to-end connection from the X.25 device 102 to the TCP device 118. More specifically, the control logic 204 includes logic for performing a set of steps as shown in FIG. 6. Beginning at step 602, the control logic 204 first receives the X.25 reset message 502, in step 604. Then, the control logic 204 proceeds to terminate its TCP connection with the TCP device 118, in step 606. As described above, terminating the TCP connection in step 606 involves transmitting a TCP FIN message 504 to the TCP device 118 (step 608), waiting for a TCP FIN message 506 in response from the TCP device 118 (step 610), and transmitting a TCP FIN/AC K message 508 to the TCP device 118 (step 612). Once the TCP connection is terminated in step 606, the control logic 204 transmits an X.25 confirm message 510 to the X.25 device 102, in step 614, and terminates in step 699.

Although the various embodiments are described with specific reference to a translating apparatus for enabling communication between an X.25 device and a TCP device, it will be apparent to a skilled artisan that the techniques of the present invention apply more generally to a translating apparatus for enabling communication between two devices supporting different communication protocols. Thus, the translating apparatus enables communication between a first device utilizing a first communication protocol and a second device utilizing a second communication protocol. More specifically, the first device communicates with the translating apparatus using the first communication protocol, and the second device communicates with the translating apparatus using the second communication protocol. The translating apparatus performs the functions necessary to establish an end-to-end connection between the first device and the second device, for example, as described herein and in the related U.S. patent application Ser. No. 09/167,839; terminate an end-to-end connection between the first device and the second device, for example, as described herein and in the related U.S. patent application Ser. No. 09/167,839; recover from a connection failure, for example, as described in the related U.S. patent applications Ser. No. 09/167,950 and 09/167,746; and exchange application data, for example, as described in the related U.S. patent applications Ser. Nos. 09/167,792 and 09/167,811.

In a preferred embodiment of the present invention, the control logic 204 is implemented as a set of program instructions that are stored in a computer readable memory within the translating apparatus 110 and executed on a microprocessor within the translating apparatus 110. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other means including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

The present invention may be embodied in other specific forms without departing from the essence or essential characteristics. The described embodiments are to considered in all respects only as illustrative and not restrictive.

What is claimed is:

1. In a translating apparatus having a first communication interface for communicating with a first device using a first communication protocol and a second communication interface for communicating with a second device using a second communication protocol different from said first communication protocol, a method of establishing a connection between said first device and said second device, the method comprising:

establishing a first connection with said first device using said first communication protocol over said first communication interface;

receiving a first data message from said first device over said first connection; and establishing a second connection with said second device over said second communication interface upon receiving said first data message over said first connection.

2. The method of claim 1, wherein:

said first communication protocol comprises an X.25 protocol;

said first connection comprises an X.25 connection; and said first data message comprises an X.25 data frame including application data.

3. The method of claim 1, wherein said second communication protocol is a Transmission Control Protocol (TCP), and wherein establishing said second connection comprises establishing a TCP connection.

4. The method of claim 3, wherein establishing the TCP connection comprises:

transmitting to said second device over said second communication interface a first TCP SYN message in order to initiate establishment of the TCP connection;

receiving from said second device over said second communication interface a second TCP SYN message; and transmitting to said second device over said second communication interface a TCP SYN/ACK message in order to complete establishment of the TCP connection.

5. The method of claim 1, further comprising:
transmitting to said second device over said second connection a second data message containing data from said first data message.

6. A computer program for controlling a computer system, the computer program comprising:
first connection establishment logic programmed to establish a first connection with a first device using a first communication protocol;
receiving logic programmed to receive a first data message from said first device over said first connection; and
second connection establishment logic programmed to establish a second connection with a second device using a second communication protocol different than said first communication protocol upon receiving said first data message over said first connection.

7. A translating apparatus comprising:
a first communication interface for communicating with a first device using a first communication protocol;
a second communication interface for communicating with a second device using a second communication protocol different from said first communication protocol;
first connection establishment logic operably coupled to establish a first connection with said first device using said first communication protocol over said first communication interface;
receiving logic operably coupled to receive a first data message over said first connection; and
second connection establishment logic operably coupled to establish a second connection with said second device using said second communication protocol over said second communication interface upon receiving said first data message over said first connection.

8. The translating apparatus of claim 1, wherein:
said first communication protocol comprises an X.25 protocol;
said first connection comprises an X.25 connection; and
said first data message comprises an X.25 data frame including application data.

9. The translating apparatus of claim 7, wherein said second communication protocol comprises a Transmission Control Protocol (TCP), and wherein said second connection comprises a TCP connection.

10. The translating apparatus of claim 9, wherein the second connection establishment logic comprises:
logic that transmits a first TCP SYN message to said second device over said second communication interface in order to initiate establishment of the TCP connection;
logic that receives a second TCP SYN message from said second device over said second communication interface; and
logic that transmits a TCP SYN/ACK message to said second device over said second communication interface upon receiving the second TCP SYN message in order to complete establishment of the TCP connection.

11. The translating apparatus of claim 7, further comprising:
transmitting logic operably coupled to transmit to said second device over said second connection a second data message containing data from said first data message.

12. In a system having a first device in communication with a translating apparatus using a first communication protocol and a second device in communication with said translating apparatus using a second communication protocol different from said first communication protocol, a method of establishing a connection between said first device and said second device, the method comprising the steps of:
establishing, by said translating apparatus, a first connection with said first device;
transmitting, by said first device to said translating apparatus, a first data message;
receiving, by said translating apparatus, said first data message; and
establishing, by said translating apparatus, a second connection with said second device upon receiving said first data message.

13. The method of claim 12, wherein:
said first communication protocol comprises an X.25 protocol;
said first connection comprises an X.25 connection; and
said first data message comprises an X.25 data frame containing application data.

14. The method of claim 12, wherein said second communication protocol comprises a Transmission Control Protocol (TCP), and wherein establishing said second connection comprises establishing a TCP connection.

15. The method of claim 14, wherein establishing the TCP connection comprises:
transmitting, by said translating apparatus to said second device, a first TCP SYN message;
receiving, by said second device, said first TCP SYN message;
transmitting, by said second device to said translating apparatus, a second TCP SYN message;
receiving, by said translating apparatus, said second TCP SYN message; and
transmitting, by said translating apparatus to said second device, a TCP SYN/ACK message.

16. The method of claim 12, further comprising:
transmitting, from said translating apparatus to said second device, a second data message containing data from said first data message.

17. In a translating apparatus having a first connection with a first device using a first communication protocol and a second connection with a second device using a second communication protocol different from said first communication protocol, a method of terminating a connection between said first device and said second device, the method comprising:
receiving a reset message from said first device over said first connection; and
terminating said second connection after receiving said reset message.

18. The method of claim 17, wherein:
said first communication protocol comprises an X.25 protocol;
said first connection comprises an X.25 connection; and
said reset message comprises an X.25 reset message.

19. The method of claim 17, wherein said second communication protocol comprises a Transmission Control Protocol (TCP), and wherein terminating said second connection comprises terminating a TCP connection.

20. The method of claim 19, wherein terminating the TCP connection comprises:

transmitting to said second device a first TCP FIN message in order to initiate termination of the TCP connection;

receiving from said second device a second TCP FIN message; and transmitting to said second device a TCP FIN/ACK message in order to complete termination of the TCP connection.

21. The method of claim 17, further comprising:

transmitting to said first device a reset confirmation message.

22. The method of claim 21, wherein said first communication protocol comprises an X.25 protocol;

said first connection comprises an X.25 connection; and said reset confirmation message comprises an X.25 confirm message.

23. A computer program for controlling a computer system, the computer program comprising:

receiving logic programmed to receive a reset message from a first device using a first communication protocol, said reset message suspending data flow on a first connection with said first device; and connection termination logic programmed to terminate a second connection with a second device using a second communication protocol different than said first communication protocol upon receiving said reset message.

24. The apparatus of claim 23, wherein the computer program further comprises:

transmitting logic programmed to transmit a reset confirmation message to said first device.

25. A translating apparatus comprising:

a first communication interface for communicating with a first device using a first communication protocol;

a second communication interface for communicating with a second device using a second communication protocol different from said first communication protocol;

receiving logic operably coupled to receive from said first device over said first communication interface a reset message suspending data flow on a first connection with said first device;

connection termination logic operably coupled to terminate a second connection with said second device over said second communication interface after receiving said reset message.

26. The translating apparatus of claim 25, wherein said first communication protocol commprises an X.25 protocol;

said first connection comprises an X.25 connection; and said reset message comprises an X.25 reset message.

27. The translating apparatus of claim 25, wherein said second communication protocol comprises a Transmission Control Protocol (TCP), and wherein said second connection comprises a TCP connection.

28. The translating apparatus of claim 27, wherein said connection termination logic comprises:

logic that transmits to said second device over said second communication interface a first TCP FIN message;

logic that receives from said second device over said second communication interface a second TCP FIN message; and logic that transmits to said second device over said second communication interface a TCP FIN/ACK message.

29. The translating apparatus of claim 25, further comprising:

transmitting logic operably coupled to transmit to said first device over said first communication interface a reset confirmation message.

30. The translating apparatus of claim 29, wherein:

said first communication protocol comprises an X.25 protocol, said first connection comprises an X.25 connection; and said reset confirmation message comprises an X.25 confirm message.

31. In a system having a first device in communication with a translating apparatus using a first communication protocol and a second device in communication with said translating apparatus using a second communication protocol different from said first communication protocol, a method of terminating a connection between said first device and said second device, the method comprising:

transmitting, by said first device to said translating apparatus, a reset message suspending data flow on a first connection between said first device and said translating apparatus;

receiving, by said translating apparatus, said reset message; and terminating, by said translating apparatus, a second connection with said second device after receiving said reset message.

32. The method of claim 31, wherein:

said first communication protocol comprises an X.25 protocol;

said first connection comprises a X.25 connection;

said reset message comprises an X.25 reset message.

33. The method of claim 31, wherein said second transmission protocol comprises a Transmission Control Protocol (TCP), and wherein terminating said second connection comprises terminating a TCP connection.

34. The method of claim 33, wherein terminating the TCP connection comprises:

transmitting, by said translating apparatus to said second device over said second communication interface, a first TCP FIN message;

receiving, by said second device, said first TCP FIN message;

transmitting, by said second device to said translating apparatus, a second TCP FIN message;

receiving by said second device to said translating apparatus, a second TCP FIN message; and transmitting, by said translating apparatus to said second device, a TCP FIN/ACK message.

35. The method of claim 34, further comprising:

transmitting, by said translating apparatus to said first device, a reset confirmation message.

36. The method of claim 35, wherein:

said first communication protocol comprises an X.25 protocol; and said reset confirmation message comprises an X.25 confirm message.

* * * * *